United States Patent [19]

Stage et al.

[11] 4,394,221

[45] Jul. 19, 1983

[54] METHOD OF DEODORIZING AND/OR DEACIDIFYING HIGH-BOILING ORGANIC COMPOUNDS, PARTICULARLY EDIBLE OILS

[75] Inventors: Hermann Stage; Hartmut Hammer, both of Köln-Niehl; Walter Kühns, Dormagen, all of Fed. Rep. of Germany

[73] Assignee: Firma Wilhelm Schmidding GmbH & Co., Cologne, Fed. Rep. of Germany

[21] Appl. No.: 137,535

[22] Filed: Apr. 4, 1980

[30] Foreign Application Priority Data

Apr. 7, 1979 [DE] Fed. Rep. of Germany ....... 2914101

[51] Int. Cl.³ .......................... B01D 1/06; B01D 1/14; C11B 3/14
[52] U.S. Cl. ......................................... 203/89; 203/92; 203/100; 159/13 A; 159/13 C; 159/49; 159/16 S; 260/428; 426/488; 426/492
[58] Field of Search ....................... 203/89, 96, 97, 92, 203/93, 100, 72, 95; 159/13 A, 13 B, 13 R, 16 S, 49, 13 C, 8, 14; 426/488, 487, 492; 260/428; 202/205, 234, 233, 237, 236

[56] References Cited

U.S. PATENT DOCUMENTS

| | | | |
|---|---|---|---|
| 568,615 | 9/1896 | Haubtman | 159/13 C |
| 2,759,883 | 8/1956 | Thurman | 260/428 |
| 2,804,427 | 8/1957 | Suriano | 260/428 |
| 2,991,298 | 7/1961 | Raffa et al. | 260/428 |
| 3,147,174 | 9/1964 | Cook | 159/13 C |
| 3,436,319 | 4/1969 | Von Horst et al. | 203/89 |
| 3,542,653 | 11/1970 | Lowrey et al. | 203/96 |
| 3,620,282 | 11/1971 | Newton | 159/13 C |
| 3,737,378 | 6/1973 | Mori et al. | 203/89 |
| 3,763,020 | 10/1973 | Drew et al. | 426/492 |
| 3,904,777 | 9/1975 | Goerling et al. | 426/487 |
| 4,017,355 | 4/1977 | Kiyota et al. | 159/13 C |

Primary Examiner—Wilbur L. Bascomb, Jr.
Attorney, Agent, or Firm—Watson, Cole, Grindle & Watson

[57] ABSTRACT

A method and apparatus for purifying (deodorizing and/or deacidifying) high-boiling, heat-sensitive organic liquids, the method including passing the impure organic liquid in counter-current flow to a carrier vapor of low molecular weight (steam) while the organic liquid is in the form of thin films falling through a multiplicity of parallel, vertically-oriented tubular flow channels, the inside diameters of the flow channels being between 34 and 72 mm, their lengths being between 6 and 16 meters, a heating medium also being present in association with the flow channels, the flow rates and temperatures of the various fluids being controlled to reduce the consumption of carrier vapor and provide a short thermal stress time for the organic liquid.

8 Claims, 2 Drawing Figures

METHOD OF DEODORIZING AND/OR DEACIDIFYING HIGH-BOILING ORGANIC COMPOUNDS, PARTICULARLY EDIBLE OILS

BACKGROUND OF THE INVENTION

1. Field of the Invention

This invention relates to a method of deodorizing and/or deacidifying high boiling organic compounds, particularly edible oils.

2. The Prior Art

There are already numerous known methods of deodorizing and/or deacidifying organic compounds, particularly edible oils, which involve the elimination of readily volatile impurities by distillation with the aid of propellant or carrier vapors, e.g. water vapor.

Special problems arise if the material to be treated has low volatility or is virtually non-distillable and also heat-sensitive. All these conditions occur in major industrially important deodorizing processes such as for instance in the deodorization and deacidification of edible oils, the deodorization of the high-molecular weight esters of high boiling acids or alcohols such as, e.g., phthalic acid esters which are used as plasticizers, or the deodorization of high molecular weight paraffins for separating the low molecular weight fractions, and so on.

In all such cases, the heat-sensitive material from which volatile impurities are to be separated has an extremely low working pressure under the permissible pressure and temperature conditions compared with the components which are to be separated therefrom, this pressure being lower by several times the power of ten than that of the compounds which are to be eliminated. Under such working conditions, the compound can be brought to the boiling point for distillative separation only by adding a suitable amount of carrier water vapor which provides the main part of the required working pressure. Because of the thermal sensitivity the working pressures are always less than 10 Torr in the above-mentioned cases. Owing to the low condensation temperature of the carrier vapor, which is 11° C., this entails a very high energy demand for the associated steam-jet vacuum-unit, amounting to a multiple of the amount of carrier steam actually required. For a given working pressure of, e.g., 6 millibar, it is directly proportional to the amount of used stripping steam.

Stripping steam demand decreases with falling working pressure but the steam consumption of the steam ejector unit increases. For reasons of economy therefore, a minimum carrier-vapor consumption at an easy to control working pressure between 1 and 10 Torr should be aimed at. This means further that, in a counterflow-multistage exchange process between descending oil and ascending stripping steam which latter gathers an increasing concentration of odour-compounds, optimum conditions are obtained if this counter-flow-exchange process can be applied at approximately constant low working pressure and rising temperatures right to the end thereof.

These conditions can only be realized in a counter-flow film exchange process and for this reason there have already been various attempts to use falling-film columns for this purpose. For example, H. P. Kaufmann and K. D. Mukherjee (Fette, Seifen, Anstrichmittel—fats, soaps, paints 68,319 (1966), 70,197,370,589,801,901 (1968)) tried to obtain better results with falling-film-evaporators. However, they failed to achieve the desired success. The residual oil still had an FFA content of 0.2%, whilst the distillate was obtainable only below 90 to 95% fatty acid. Steam consumption at 200 to 300 kg/to was also very high.

One of the present inventors also undertook experiments with a view to achieving improved results by applying a counterflow falling-film process for deodorization and aiming for improved efficacy by means of an externally imposed temperature field. Whilst the application of this temperature field improved the transverse flow of the liquid particles of the falling film to the film surface, it nevertheless failed to achieve the vital breakthrough with regard to low quantities of carrier steam and less energy consumption.

Conventional modern physical processing plants used for the deacidification of palm oil operate at approximately 5 mbar and 260° C. with an average consumption of steam at the rate of 30 kg/ton oil.

The present invention is aimed at achieving a considerable reduction in stripping steam consumption. A further aim of the invention resides in achieving a shorter thermal stress time for the treated high molecular weight substances and creating better heat exchange and recovery conditions between outflowing and incoming liquids. According to this invention these objects are achieved by establishing the following conditions:

1. Working pressure between 2–10 mbar, preferably 4–8 mbar.
2. Working temperature below decomposition point.
3. Liquid viscosity of the falling film below 0.003 Pa·s, preferably below 0.001 Pa·s.
4. Reynold's number of the liquid above 100, preferably over 200.
5. Pressure drop: Less than half, preferably less than 0.3 of head pressure.
6. Exchanger length of trickle surface areas 6–16 m, preferably 8–12 m.
7. Inside diameter of trickle channels 34–72 mm, preferably 44–54 mm.
8. Liquid load per m trickle channel circumference, 0.5–4 m$^3$/m·h, preferably 1–2.5 m$^3$/m·h.
9. Warm-up in falling-film column 10°–20° K.
10. Heating medium temperature above oil-discharge temperature of max. 5° K., preferably 1°–2° K.
11. Exchange time in trickle-column of 10 to 20 s.

By applying the method according to this invention, energy consumption is significantly reduced and, for instance, in processing palm oil, a steam consumption of between 7 and 9 kg/to was achieved at comparatively short exposure or stress time for the oil.

The present invention also relates to apparatus for implementing the method. In a first embodiment of the apparatus according to this invention the counterflow-falling film evaporator consisted of a shell and tube column charged with the liquid which was to be deodorized by means of a distributor whilst the stripping steam enters the tubes from below in contraflow with the liquid. In many cases, it may be convenient and advantageous to arrange a cross-current vessel in succession with the upright shell and tube column or column with parallel honeycombchannels, to collect the treated liquid, the stripping steam inlet being then arranged inside the collecting liquid in order to eliminate any potentially occurring discolorations of the deodorized liquid.

DESCRIPTION OF THE DRAWINGS

Two embodiments of the invention are illustrated by way of example in the accompanying drawings wherein.

DETAILED DESCRIPTION OF THE PREFERRED EMBODIMENTS

Figure 2:
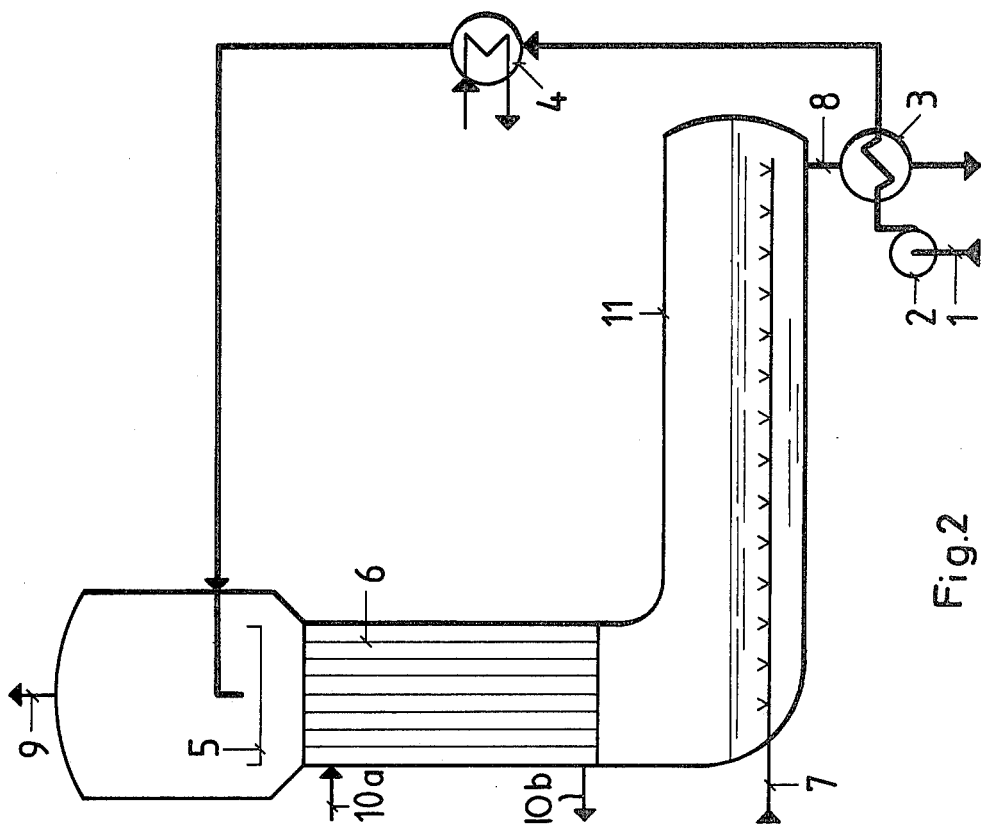
Figure 1:
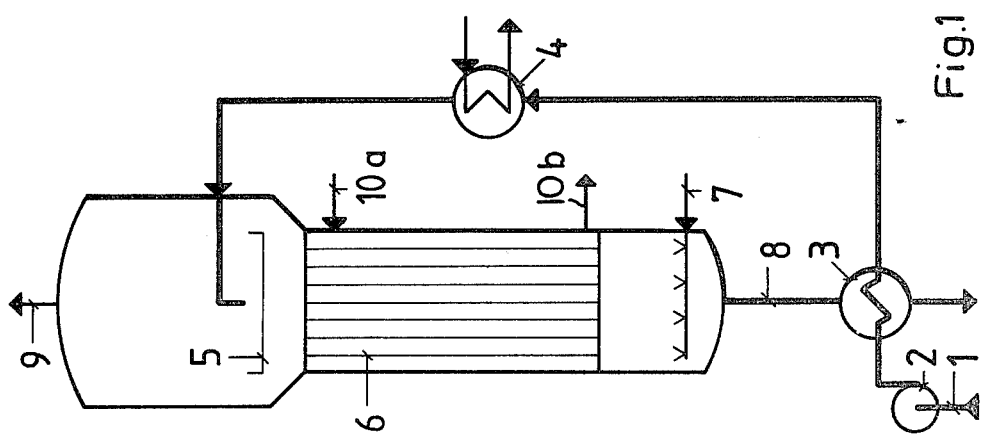
FIG. 1 is a diagrammatic view of a first embodiment and FIG. 2 a diagrammatic view of a second embodiment of the invention.

Through the main supply or feed pipe 1 crude palm oil is fed at the rate of 1000 kg/h, at 80° C. and containing 5% FFA, to the pump 2 which pumps it through a heat exchanger 3 where the crude palm oil is heated to a temperature of 260° C. Heat losses due to cooling are made good in a heat exchanger 4 and the crude palm oil is then delivered at a temperature of 250° C. to the distributor plate 5 at the top, or head, of the column. From this distributor plate 5 the crude palm oil descends gravitationally into the "falling-film" column 6, which consists, for example, of a shell and tube column or similar pipe assembly. Additional heat may be supplied to the falling-film column by means of a heating medium supply, schematically indicated at 10a. The part of the pipe system in the lower column region below the inlet 10a of the heating medium which is indicated by the direction arrow 10b represents the outlet for the heating medium. Thus it can be seen that the heating medium flows along a major portion of the length of the falling-film column 6. The steam or vapor feed pipe 7 through which the stripping steam or other vapor is delivered at the rate of approximately 8.5 kg/h is arranged underneath the falling-film column 6, and the steam or vapor and volatile impurities stripped from the falling liquid films are removed from above column 6 by discharge line 9.

In the region beneath the column a pressure of 7.5 mbar builds up whereas a 5.1 mbar pressure exists in the head of the column above the pipe system. The purified palm oil is conducted through the outlet pipe 8 into the heat exchanger 3 where it heats up the incoming flow of crude palm oil. Under these conditions purified palm oil at 100° C. and having a residual FFA-content of 0.05% is drawn from the heat exchanger at the rate of roughly 950 kg/h.

FIG. 2 shows another embodiment, like reference numbers designating like or analogous parts in both figures. In this arrangement a transverse-flow, or cross-current vessel 11 is provided for aftertreatment of the purified palm oil which collects in the vessel 11. The steam delivery pipe 7 extends through vessel 11 in such a way as to be submerged in the purified palm oil so that the steam is constrained to pass through the purified palm oil and react vigorously with the liquid before entering the pipe system 6.

The abbreviation FFA as hereinbefore referred to designates all free fatty acids and the more volatile impurities, the abbreviations Pa·s and m·h mean Pascal seconds and meter hours, respectively.

We claim:

1. A method of removing volatile impurities from a high-boiling, heat-sensitive organic liquid, which method comprises (a) passing said high-boiling, heat-sensitive organic liquid which contains volatile impurities downwardly through a multiplicity of parallel, vertically-oriented tubular flow channels so as to divide said organic liquid into a multiplicity of free falling films, said flow channels having inside diameters of 34 to 72 mm and lengths of 6 to 16 meters, the liquid load application being controlled to a rate of between 1 and 2.5 m$^3$/m.hour/meter of flow channel circumference, (b) concurrently passing a heated medium along a major portion of the length of said vertically-oriented tubular flow channels, and (c) concurrently passing a carrier vapor consisting of steam upwardly through said vertically oriented flow channels in counterflow to the flow of said liquid films, the steam exiting the upper ends of said flow channels with the volatile impurities and the organic liquids exiting the lower ends of said flow channels in purified form, the initial temperatures of said organic liquid in step (a) and said heated medium in step (b) and the flow rate of steam of step (c) being controlled such that the working pressure in said flow channels is between 2 and 10 mbar and the pressure drop thereacross is less than half of the head pressure, the working temperature in the flow channels is below the decomposition point of the organic liquid, the viscosity of the free falling liquid films is less than 0.003 Pa·s, the Reynolds number of the liquid is over 100, the warm-up of the liquid in the flow channels is between 10° and 20° K., the exchange time in the flow channels is between 10 and 20 seconds and the initial temperature of the heated medium is a maximum of 5° K. above the exiting temperature of the purified organic liquid.

2. The method of claim 1, wherein said high-boiling, heat-sensitive organic liquid is palm oil.

3. The method of claim 1 wherein the working pressure in said flow channels is controlled to between 4 and 8 mbar.

4. The method of claim 1, wherein the pressure drop across said flow channels is controlled to less than 0.3 of the head pressure.

5. The method of claim 1, wherein the viscosity of the free falling liquid films is less than 0.001 Pa·s.

6. The method of claim 1, wherein the Reynolds number of the liquid is over 200.

7. The method of claim 1, wherein the initial temperature of the heated medium is between 1° and 2° K. above the exiting temperature of the purified organic liquid.

8. The method of claim 1, wherein the high-boiling, heat-sensitive organic liquid which contains volatile impurities is palm oil, wherein said palm oil has an initial temperature of 250° C. and is fed to the flow channels at a rate of 1000 kg/hour; wherein said steam is fed to said flow channels at a rate of 8.5 kg/hour; wherein the pressure above said flow channels is 5.1 mbar and below said flow channels is 7.5 mbar.

* * * * *

UNITED STATES PATENT AND TRADEMARK OFFICE
CERTIFICATE OF CORRECTION

PATENT NO. : 4,394,221
DATED : July 19, 1983
INVENTOR(S) : Stage et al

It is certified that error appears in the above-identified patent and that said Letters Patent are hereby corrected as shown below:

[73]   Assignee:   Firma Wilhelm Schmidding GmbH & Co.,
Cologne, Federal Republic of Germany, part interest.

Signed and Sealed this

Tenth Day of July 1984

[SEAL]

*Attest:*

GERALD J. MOSSINGHOFF

*Attesting Officer*   *Commissioner of Patents and Trademarks*